United States Patent [19]

Rote et al.

[11] 4,001,012

[45] Jan. 4, 1977

[54] METHOD OF PRODUCING STAINLESS STEEL

[75] Inventors: Franklin E. Rote, Homewood, Ill.; Raymond C. Stephan, Gary, Ind.

[73] Assignee: United States Steel Corporation, Pittsburgh, Pa.

[22] Filed: Nov. 28, 1973

[21] Appl. No.: 419,753

[52] U.S. Cl. .................................. 75/51; 75/52; 75/59; 75/60

[51] Int. Cl.$^2$ .................................. C21C 5/34

[58] Field of Search .............. 75/51, 52, 59, 60

[56] References Cited

UNITED STATES PATENTS

| | | | |
|---|---|---|---|
| 3,711,278 | 1/1973 | Josefsson | 75/130.5 |
| 3,773,496 | 11/1973 | Knuppel | 75/130.5 |

*Primary Examiner*—Peter D. Rosenberg
*Attorney, Agent, or Firm*—Forest C. Sexton

[57] ABSTRACT

A process for producing stainless steel whereby unrefined molten iron is partially refined by blowing oxygen therethrough to slag the phosphorus; removing the slag therefrom; adding chromium-bearing material to the metal and blowing with oxygen shielded with a protective jacket fluid to melt the chromium-bearing material; thereafter continuing the blow to refine the chromium-containing metal; and finally adding slag reducing agents and blowing with inert gas to reduce chromium from the slag, and remove dissolved gases from the metal.

17 Claims, No Drawings

METHOD OF PRODUCING STAINLESS STEEL

BACKGROUND OF THE INVENTION

It is well known in the industry that conventional methods for producing steel, are not suited to the production of stainless steel or other chromium containing steels. This is because conventional steel producing processes, such as the open hearth furnace or basic oxygen furnace, refine impurities from the steel by oxidation reactions. In the case of stainless steel, the chromium content therein would be oxidized to a great extent before suitable low levels of carbon and phosphorus could be achieved. Until quite recently therefore, most stainless steel produced in the United States has been produced by an electric arc furnace process primarily utilizing a charge of selected stainless steel and carbon steel scrap, and low-carbon ferrochromium. Since carbon and phosphorus are initially avoided in the charge, the metal can be easily refined without substantial chromium oxidation.

Although electric arc furnaces provide considerable flexibility and a high degree of control, arc furnace processes have the disadvantage of being costly and time consuming. In the past few years there has been a revolution in the stainless steel producing industry, as at least two new processes for its production have been utilized commercially, and others have been patented. For example, in at least one plant, stainless steel has been produced in a basic oxygen furnace utilizing less expensive high-carbon ferrochromium. The carbon is selectively oxidized therefrom without oxidation of chromium by maintaining an abnormally high temperature at which equilibrium conditions are such as to favor carbon oxidation. Because of the high temperatures necessary for this process, refractory life of the vessel is greatly shortened.

Another new process is the AOD (argon-oxygen decarburization) process which also permits the use of the lower cost high-carbon ferrochromium. In this process, selected scrap and high-carbon ferrochromium are first melted in an electric furnace and thereafter transferred to an AOD vessel where oxygen and argon are jointly blown through the metal via tuyeres through the side of the vessel. The argon in the blown gas serves to reduce the oxygen partial pressure and oxygen activity, and hence shift the carbon-chromium equilibrium to favor carbon oxidation. As lower carbon contents are achieved, the argon concentration is increased causing a further equilibrium shift and further carbon oxidation. Although this process has been widely adopted and does present considerable advantages over conventional electric furnace practices, it is still not as economical as would be hoped for because multiple vessels are required, because large volumes of rather expensive argon are required, and the subsurface oxygen injection does adversely affect refractory life in the AOD vessel.

SUMMARY OF THE INVENTION

An object of this invention is to provide a quick and inexpensive method for producing chromium containing steel by a single vessel practice utilizing a bottom-blown oxygen steelmaking vessel.

Another object of this invention is to provide a method of producing chromium containing steel from a charge of blast furnace hot metal or any other metal containing appreciable amounts of carbon, phosphorus and other usual impurities.

A further object of this invention is to provide a method of producing chromium containing steel in which high-carbon ferrochromium may be utilized.

Still another object of this invention is to provide a method of producing chromium containing steel not involving exceptionally high temperatures.

DESCRIPTION OF THE PREFERRED EMBODIMENT

A relatively new process for making conventional steel, the bottom-blown oxygen steelmaking process, is beginning to receive considerable attention. Like the more conventional top blown basic oxygen process, the new bottom blown oxygen process is a basic process utilizing a combination of an oxygen blow and lime-containing basic slag to remove impurities from the molten pig iron. Unlike the conventional top blown process however, the new bottom-blown oxygen process blows oxygen through tuyeres extending through the vessel refractory lining below the molten metal surface. Each tuyere is substantially flush with the inside surface of the vessel refractory lining and is of a double-pipe construction wherein oxygen is blown through a central pipe which is surrounded by a larger concentric pipe for the simultaneous injection of a protective jacket fluid such as natural gas, propane or other gaseous or liquid hydrocarbons, or at least a fluid containing such hydrocarbons. The hydrocarbon jacket fluid acts as a super coolant, endothermically dissociating to prevent the rapid increase in temperature that would otherwise result from the oxidation reactions, and prevent the rapid erosion of the tuyeres and adjacent refractory material.

The vessel utilized in the above described bottom-blown oxygen process is ideally suited to the practice of this invention for producing chromium containing steels. Hence, this inventive process offers the added advantage of providing those steel mills already having bottom-blown oxygen steelmaking facilities with a capability for producing chromium containing steels with those facilities without modification thereof. In fact, the vessel can be used alternately to produce conventional steel or chromium steel as desired.

In the practice of this invention the chromium containing steel may be produced from a variety of starting materials such as blast furnace hot metal, premelted scrap, etc. In our preferred practice however, we start with scrap and blast furnace hot metal utilizing a procedure identical to that used in making conventional low-carbon steels. In this preferred practice, a bottom-blown oxygen refining vessel is first charged with a suitable amount of scrap steel and then with blast furnace hot metal which contains the usual impurities. The scrap steel should ideally be about 20% of the total charge although as much as 30–35% scrap can be used. Although the scrap steel should not contain appreciable amounts of chromium, alloys containing copper, molybdenum and nickel may be used to the extent such alloy additives are desired in the steel to be produced. The composition of the hot metal will usually be on the order of 4–5% carbon, 0.5–1.0% manganese, 0.5–2% silicon, 0.03–0.10% phosphorus, and 0.05% sulfur. The hot metal is preferably charged at a temperature of 2300°–2500° F, and ideally at 2400° F.

When the vessel has been charged with a suitable charge the heat is given a first blow with oxygen, preferably having a flux such as lime entrained therein, and a jacket fluid according to conventional bottom-blown oxygen practices to melt the scrap and reduce the phosphorus content to below 0.030% and under conditions that will yield a fluid basic slag. According to conventional bottom-blown oxygen practices, approximately one pound of powdered lime is used for every 10 cubic feet of oxygen. The preferred rate of other fluxes can easily be determined for any particular heat. The amount of oxygen will of course depend upon the heat size and metal chemistry, and is usually within the range 1400 to 2000 cubic feet per ton of metal. As a minimum, the jacket fluid should be admitted at a pressure sufficient to maintain the ferrostatic head thereover thereby preventing the hot metal from entering the tuyere. The preferred rate of jacket fluid however will depend upon the specific jacket fluid used and is adjusted to optimize tuyere and refractory life. As an example, when natural gas is used as the jacket fluid, the rate thereof should be within the range 5 to 15 volume percent of the oxygen rate, and preferably about 8 volume percent of the oxygen flow rate. Although natural gas is the most common jacket fluid used in conventional bottom-blowing oxygen processes in the United States, other hydrocarbon fluids can be used in either gaseous or liquid form. For the first blow of the process of this invention, inert gases such as argon can also be used as the jacket fluid. Although inert jacket gases will shield the injected oxygen momentarily to protect the tuyeres and bottom refractories from rapid erosion, inert gases do not cool as well as do the hydrocarbon fluids because such gases do not dissociate endothermically. Hence, hydrocarbon fluids are preferred for the jacket fluid.

It is essential that the first blow be sufficient to attain the final desired phosphorus content, usually below 0.030%, and should produce slag having a "V-ratio" to 1.5 to 8.0, and preferably 2.5 to 4.5. This will usually require about a 15 minute blow. The V-ratio is a measure of the slag's basicity, and expresses the ratio of amount of lime (CaO) over the amount of silica ($SiO_2$). The blow will also reduce the heat's carbon content to about 0.03% or less, and will cause the metal temperature to increase to about 2850° to 3100° F. Although most commercial bottom-blown oxygen facilities do employ a system whereby the slagging flux is entrained within the oxygen blow, it is of course possible if preferred to add the flux in bulk form to the heat.

It should be noted that the above discussed first blowing step is essentially the same as that used in conventional bottom-blown oxygen steelmaking processes for making conventional steel, and hence further detailed discussion thereof is not necessary. The only distinction between the above first blowing step and conventional bottom-blown oxygen steelmaking practices is that the first blow in this process may be somewhat shorter since the primary objective thereof is to remove phosphorus from the metal to the final desired level. Although the removal of other impurities, notably carbon is of course essential during the first blow, the level to which it is removed is not of particular significance, since subsequent blowing steps will ultimately oxidize carbon and other impurities to the final desired levels.

Following the first blow as described above, the slag must be removed from the system. Any of a number of known procedures may be used. For example, the entire heat can be tapped from the vessel into a ladle and then reladled to substantially separate the slag from the metal. As alternative methods, the vessel can be tilted to decant the slag therefrom, or to flush the slag out with a blast of mixed gases or the use of manual or mechanical rakes. This first slag will contain a large percentage of the impurities including substantially all of the phosphorus, and is therefore discarded to remove such impurities, especially the phosphorus, from the system. Failure to remove this slag will cause substantial reversion of the phosphorus to the metal during subsequent processing. In addition, this slag will contain appreciable amounts of any chromium which may have been in the original charge. As already noted above, scrap containing appreciate amounts of chromium should therefore not be added before the first blow lest it be lost in the discarded first slag.

At this point, after the first blow and deslagging step, the remaining metal has been partially refined to steel usually containing less than 0.30% carbon, less than 1% manganese, less than 0.025% each of phosphorus and sulfur and less than 1% silicon.

After the first blow, and after the slag has been removed from the partially refined metal, it is preferable to add sufficient ferrosilicon to the metal for deoxidation purposes, typically on the order of about 5 pounds of silicon per ton of metal. Concurrently or thereafter, chromium-bearing materials are added in an amount sufficient to supply the desired final chromium content or an amount slightly therebelow. Although the chromium can be supplied with ferrochromium exclusively, or chromium-bearing scrap exclusively, it is preferred for economic purposes to add both ferrochromium and chromium-bearing scrap, the latter in amounts preferably not exceeding about 700 pounds per ton of metal. If only chromimum-bearing scrap is used, it will usually be necessary to add an amount of exothermically oxidizable material such as carbon or silicon, preferably silicon in the form of ferrosilicon, in order to melt the scrap without excessively chilling the molten metal charge. To be more specific, it is of course preferred that the chromium-bearing materials be melted into the molten charge without any significant chilling of the charge. To this end, the exothermically oxidizable material, such as ferrosilicon, is added to the vessel along with the chromium-bearing scrap. Upon subsequent blowing with oxygen, the silicon in the ferrosilicon will oxidize to supply the heat necessary to melt the chromium-bearing scrap while substantially maintaining the molten metal temperature at a constant level. On the other hand, if a low-grade, high-carbon ferrochromium is used alone as the chromium source, or used in appreciable amounts in combination with chromium-bearing scrap, such low-grade ferrochromium will usually contain sufficient carbon and silicon to provide the necessary heat not only to melt the ferrochromium, but appreciable quantities of chromium-bearing scrap as well. It is apparent therefore that the amount of such exothermic oxidizable material to be added, if used at all, may vary widely depending upon the amount of steel scrap added, the amount of silicon and carbon included in the ferrochromium and the amount of silicon and carbon remaining in the partially refined metal after the first blow. Typically, about 10 pounds of silicon per ton of metal, at a 20% scrap charge, will be sufficient, in the absence of any ferrochromium.

Although we have found a 20% scrap charge to be ideal, it should be apparent that larger quantities may be used since proportionally larger quantities of the exothermically oxidizable material will be necessary to maintain a substantially constant bath temperature. However, excessive amounts of scrap will require excessive amounts of exothermically oxidizable material and hence excessive amounts of slag will be produced with proportionally lower chromium recovery. Therefore, in order to keep the slag volume within reasonable limits, the chromium scrap added should also be kept within reasonable amounts, e.g. roughly around 20 to 30%.

If the first slag is removed from the metal without tapping the metal, the ferrosilicon, ferrochromium and chromium-bearing scrap are added directly to the metal in the bottom-blown vessel. However, if a reladling practice is used to separate the slag from the metal, it is preferable to add the deoxidizing ferrosilicon to the ladle prior to tapping. This not only serves to deoxidize the metal when tapped, but further provides heat in the bottom of the ladle to minimize a bottom skull. Subsequently the chromium charge and any ferrosilicon for melting chromium-bearing scrap are added to the empty vessel before the metal is returned thereto.

Accordingly, when an appropriate amount of ferrosilicon and chromium-containing additives are present in the metal, the charge is again blown as before. The primary objective during this second blow is to melt in the ferrochromium and chromium-bearing scrap. Again the charge is blown with oxygen and a protective jacket fluid as described for the first blow, until the charged solids are melted. Blowing is thereafter continued for the purpose of oxidizing impurities from the metal until the bath carbon level is reduced to below about 1%. This blow usually requires about 15 minutes. During this second blow, the exothermic silicon oxidation will supply sufficient heat to commence melting of the ferrochromium and to melt substantially all the scrap. Once ferrochromium melting has commenced, the heat necessary for completion thereof is supplied by carbon oxidation from the ferrochromium itself. In addition, there is some silicon in the ferrochromium to supply additional heating through oxidation, typically about 1-2%; and the oxidation of chromium will provide further heating.

The above chromium melting technique is desired in order to supply sufficient heat to melt the ferrochromium and scrap without permitting the metal temperature to get too high and thus damage the vessel refractories. It is preferable therefore that the quantity of ferrosilicon used should be kept at the minimum necessary to provide a metal temperature after the blow of 2800° to 3000° F, and ideally about 2950° F.

In view of the fact that a high carbon content in the ferrochromium is desired to provide heat for further melting of the ferrochromium, and hence reduce the amount of ferrosilicon needed, a high carbon ferrochromium is actually preferred over the more costly low-carbon grades. Use of the high carbon ferrochromium will however cause the carbon content in the metal to increase, generally to a value between 1 and 2% carbon. As discussed above, however, the blow will eventually reduce the carbon content to below 1%.

The high silica slag formed during the second blow would not normally be basic. Therefore, the second blow preferably continues the use of lime or other fluxes within the oxygen blow in order to make the slag more basic and thus protect the vessel refractories. If preferred, the flux may be added in bulk form prior to or during the second blow. Despite the lime content, the slag is not usually of sufficient basicity during the second blow to remove phosphorus from the melt. In fact, any phosphorus which may be carried over from the first slag will be reverted back into the metal as this process continues. It is because of this phosphorus reversion that the first slag, containing most of the phosphorus, must be removed from the system.

During the second blow wherein temperatures of 2900°-3000° F may be achieved, the choice of protective jacket fluid is more restricted. That is, to minimize tuyere erosion at these high temperatures, the endothermic cooling effect of a hydrocarbon fluid, such as natural gas, is most essential. Therefore, during the second blow, at least where temperatures exceed about 2900° F, the protective jacket fluid must be, or at least must contain, a hydrocarbon fluid such as natural gas. Although we have used other gases, i.e. inert gases alone as the jacket fluid during the first blow, such gases do not sufficiently cool the tuyere and adjacent refractory at metal temperatures above 2900° F to prevent excessive erosion during the second blow.

After the ferrochromium and other alloy constituents are melted in, it is necessary to further refine the steel, reducing the carbon content to its final desired level while maintaining the phosphorus content at less than 0.025%. To this end, the second blow is merely continued until the final carbon level desired is reached.

During the refining portion of the second blow, chromium will commence to oxidize at an increasing rate as the carbon content of the metal decreases below about 1.0%. Therefore, when the final desired carbon content is reached, a sizable amount of the chromium will have been oxidized and collected in the slag. The extent of such chromium oxidation will of course depend upon the original amount of chromium charged and the extent to which the carbon has been removed from the metal. The greater the amount of chromium charged to the heat and the lower the final carbon content, the greater the extent of chromium oxidation.

When the carbon content of the melt has been reduced to its desired level, the bath is blown with a large amount of inert gas, such as argon, in admixture with the oxygen, for the purpose of providing an inert gas flush to remove gaseous impurities such as hydrogen. Preferably, the oxygen blow rate is substantially decreased and argon added thereto to provide an argon to oxygen ratio of about 9:1. At the same time, the hydrocarbon gas blow rate is reduced to provide a rate of about 50% of the oxygen rate. Although a pure inert gas purging blow could be provided, as is done in some prior art practices, it has been shown that maintaining a small oxygen input through the central tuyere pipe is essential to assure that the tuyere does not become overcooled to the point where it becomes plugged with solidified metal. On the other hand, it is also essential to continue blowing some hydrocarbon gas through the concentric tuyere pipe to assure adequate cooling of the tuyere and adjacent refractory to prevent excessive erosion thereof. Although the inert gas will serve as a coolant, it does not cool sufficiently to prevent excessive erosion, particularly when a small amount of oxygen is also being blown.

It is not particularly significant which tuyere outlet is used for admitting the inert gas, as it may be blown through either the central tuyere pipe with the oxygen, the concentric tuyere pipe with the jacket gas or both. This consideration will depend mostly upon the relative areas of the two tuyere openings, and the inert gas blown to maintain the 18:2:1 relationship with oxygen and hydrocarbon gas at relative constant pressures preferably of 30 to 40 psi.

During this final blow wherein an inert gas is blown, a reduction mix containing ferrosilicon is added in an amount sufficient to reduce the oxidized chromium from the slag. The actual amount of ferrosilicon added must be calculated to provide a stoichiometric amount of silicon for the chromium reduction reaction, typically being from 50 to 150 pounds of silicon per ton of metal. Lime or other fluxes may also be necessarily included in the reduction mix to control temperature and/or control slag basicity to promote sulfur retention in the slag and protect the basic lining.

After the chromium is reduced from the slag, an assay of the metal is taken, and the final composition thereof adjusted with low carbon ferroalloys. The metal is then tapped at a temperature preferably above 2800° F. Total furnace time, charge to tap, may be less than 180 minutes.

In making alloys containing nickel, copper or molybdenum, these constituents may be added at any convenient time since blowing the metal as described above will not oxidize these elements.

In the above described process, it is apparent that considerable amounts of chromium will be oxidized during the refining portion of the second blow, particularly when higher chromium grades are being produced and/or when relatively low carbon contents are being sought. Although most of this chromium base can be returned to the metal with the reduction mix, it is obvious that excessive chromium oxidation will require the addition of excessive amounts of reduction mix. Therefore, in order to reduce the amount of chromium oxidation during the refining portion of the second blow, it is desirable to include an inert gas such as argon, in the blow in admixture with the oxygen and/or jacket gas. As in the AOD process, the inert gas will serve to reduce the partial pressure of oxidizing gases, and hence favor carbon oxidation rather than chromium oxidation. However, because of higher oxygen blowing rates and shallower bath depths, considerably more chromium is oxidized by this process. Hence, the inert gas in this process will not serve to substantially prevent chromium oxidation as intended in the AOD process, but will merely reduce the extent of chromium oxidation to somewhat lower levels. Even the use of excessive amounts of inert gas will not prevent considerable chromium oxidation.

In accordance with the above preferred practice wherein an inert gas such as argon is blown during the refining portion of the second blow as well as in the final reduction and gas purging blow, a preferred blowing practice is as follows:

|  | % Oxygen | % Argon | % Natural Gas* |
|---|---|---|---|
| Blow to 1.0% C | 100 | 0 | 8 |
| 0.4% C | 75 | 25 | 8 |
| 0.04% C | 33 | 67 | 8 |
| 0.01% C | 25 | 75 | 8 |
| Reduction & Stir | 10 | 90 | 50 |
| Tap | 10 | 90 | 50 |

*Percent of Oxygen blow

As an alternative to the use of inert gas to reduce chromium oxidation, it is also possible to use a subatmospheric pressure over the metal. Such a partial vacuum will serve to reduce the partial pressure of the oxidizing gases, as does the inert gas to promote carbon oxidation at the expense of chromium oxidation. For this embodiment, a vacuum degassing vessel, modified to permit bottom blowing of oxygen and jacket fluid, may be used.

The above described embodiment has been limited to the preferred one vessel practice, i.e. wherein the entire heat from blast furnace hot metal to stainless steel has been processed in one refining vessel. It should be apparent however that a multiple vessel practice could be employed without departing from the spirit of the invention. For example, the primary object of the first blow is to remove the phosphorus from the heat before any chromium is added, that is, a conventional iron refining practice. Therefore, other iron refining procedures could be substituted for the above described first blow, provided the substituted step would reduce the phosphorus content of the heat to the final desired level. As an example, the first blow could be performed in a conventional top blown BOF vessel or a lance blown open hearth or electric furnace. By these alternative methods of course, the jacket fluid could be completely eliminated, and the metal blown with pure oxygen in accordance with conventional practices. Suitable fluxing as disclosed would of course be necessary to remove the phosphorus as required. After such partial refining, the slag would have to be removed from the system, and the metal transferred to a bottom-blown oxygen vessel for completion of the process as described.

To aid in a fuller understanding of this invention, a detailed example is presented below.

EXAMPLES

To illustrate an example of one embodiment of this invention, the procedure detailed below was used to produce a heat of AISI Grade 430 stainless steel having an aim composition: carbon 0.06 to 0.08%, manganese 0.60% max., phosphorus 0.035% max., sulfur 0.015% max., silicon 0.40% max., copper 0.50% max., nickel 0.50% max., and chromium 16.0 to 18.0%.

To commence a heat, a 30-ton bottom-blown oxygen vessel was charged with 34,700 pounds of blast furnace hot metal, 10,000 pounds of steel scrap (22 wt. %). This charge was then blown with 44,500 cubic feet of oxygen with lime entrained therein. Natural gas was used as the jacket gas at a rate equal to 8 volume percent of the oxygen rate. Lime consumption totaled 3,500 pounds, and the final melt temperature was 2920° F. The slag V-ratio was 4.1. A check analysis showed the carbon to be below 0.30% and phosphorus below 0.025%.

The vessel was then tapped into a first ladle containing 50 pounds of 48% silicon metal for deoxidation. The metal from this first ladle was subsequently reladled into a second ladle containing 500 pounds of 98% silicon metal. Before refurnacing the metal, 13,000 pounds of high carbon ferrochromium were added to the vessel. After refurnacing the metal, blowing was continued as before using the same oxygen-lime-natural gas relationship as before. After five minutes of blowing 13,000 pounds of chromium-bearing scrap was added. The blow was continued for another 2½ minutes until the bath temperature reached 2820° F. During this blow 4,510 pounds of lime was consumed.

Thereafter blowing was continued using an oxygen-argon mixture through the central tuyeres and a natural gas-argon mixture through the concentric tuyeres as the jacket gas. Through the central tuyeres the oxygen rate was 2400 scfm with 800 scfm argon, while through the concentric tuyeres, the natural gas rate was 200 scfm with 70 scfm argon. After about 5 minutes at an estimated 1% carbon level, the argon concentration was increased so that through the central tuyere the gas rates were 1000 scfm oxygen and 2000 scfm argon, while through the concentric tuyere the rates were 80 scfm natural gas and 100 scfm argon, thereby achieving a 1:2 oxygen to argon ratio. After blowing for about five more minutes, to an estimated 0.1% carbon, 4,000 pounds of 50% ferrosilicon was added along with 4,000 pounds of lime and thereafter, pure argon was blown through the tuyeres at a rate of 170 scfm to mix in the silicon and lime, reducing metallics from the slag. Mixing continued for seven minutes.

Thereafter the bath temperature was 2980° F and analysis showed the bath to contain 0.07% carbon, 0.46% manganese, 0.018% phosphorus, 0.013% sulfur, 0.26% silicon, 0.02% copper, 0.19% nickel and 16.2% chromium. The heat was therefore tapped and suitable ladle additions made thereto to bring up the chromium content.

In the interest of brevity and to facilitate and understanding of the step-by-step process sequence, the following two examples are presented in tabular form. In these two experimental heats, the same 30-ton vessel was used. The first test was designed to produce an AISI Grade 304 stainless steel having the following specification chemistry:

| Chemical Composition, % | | | | | | | | |
|---|---|---|---|---|---|---|---|---|
| C | Mn | P | S | Si | Cu | Ni | Cr | Mo |
| 0.03 | 1.00 | 0.035 | 0.025 | 0.35 | 0.50 | 8.50 | 18.20 | 0.50 |
| 0.05 | 1.75 | X | X | 0.75 | X | 9.50 | 19.20 | X |

The following sequence of steps was used:

| Step | Time Interval in Minutes | |
|---|---|---|
| 1 | 0–2 | Charge carbon steel scrap (4,650 lb) Charge 4075 lb nickel Charge hot metal (21,900 lb) |
| 2 | 2–7 | TU, blow 3000 O₂:280 NG*, lime on |
| 3 | 7–12 | TD, Temp 3040 F, sample metal and slag (0.012% C) |
| 4 | 12–15 | Tap furnace into ladle for transfer to remove slag |
| 5 | | Charge stainless scrap to furnace (21,950 lb); reladle first blown metal |
| 6 | 0–4 | Charge blown metal to furnace |
| 7 | 4–9 | TU, blow 3000 O₂:300 NG Add 13,830 lb charge Cr to furnace from conveyor 5 minutes into blow |
| 8 | 10–15 | Change gas ratios 3 O₂:1 Ar:NG (Center 2250 O₂ – 750 Ar; annulus 280 NG) |
| 9 | 15–26 | Change gas ratios 1 O₂:2 Ar:NG (Center 1000 O₂ – 2000 Ar; annulus 70 Ar –160 NG) Added 6,055 lb lime |
| 10 | 26–33 | Change gas ratios 1 O₂:3 Ar:NG (Center 750 O₂ – 2250 Ar; annulus 80 Ar –120 NG) |
| 11 | 33–35 | TD, temp 2990 F, sample metal and slag (0.061% C) |
| 12 | 35–40 | TU, blow 300 O₂ – 1800 Ar through center; 160 Ar through annulus Add reduction mix (5,375 lb 50% FeSi, 1050 lb electrolytic Mn) |
| 13 | 40–41 | TD, temp 3010 F, sample metal and slag (0.087% C) |
| 14 | 41–66 | Hold for final chem check, temp 3000 F |
| 15 | 66–68 | TU, blow 300 O₂ – 1800 Ar through center; 160 Ar through annulus Add 1000 lb coolant scrap |
| 16 | 68 | TD to tap furnace |

Ladle analysis of this heat was as follows:

| % C | % Mn | % P | % S | % Si | % Cu | % Ni | % Cr | % Mo |
|---|---|---|---|---|---|---|---|---|
| 0.092 | 1.59 | 0.032 | 0.022 | 0.40 | 0.04 | 9.19 | 19.32 | 0.08 |

The second heat was designed to produce an AISI Grade 410 stainless steel having the following specification chemistry:

| Chemical Composition, % | | | | | | |
|---|---|---|---|---|---|---|
| C | Mn | P | S | Si | Ni | Cr |
| 0.06 | 0.60 | 0.035 | 0.025 | 0.75 | 0.50 | 11.50 |
| 0.08 | X | X | X | X | X | 13.00 |

The following sequence of steps was used:

| Step | Time Interval in Minutes | |
|---|---|---|
| 1 | 0–2 | Charge carbon steel scrap (12,450 lb) Charge hot metal (30,700 lb) |
| 2 | 2–12 | TU, start blow (center 2600 O₂; annulus 280 NG*), lime on |
| 3 | 12–15 | TD, Temp 2970, sample metal and slag (0.018% C) |
| 4 | 16–18 | Tap furnace into ladle for transfer to remove slag |

-continued

| Step | Time Interval in Minutes | |
|---|---|---|
| 5 | | Charge stainless scrap to furnace (14,200 lb), reladle first blown metal |
| 6 | 0-4 | Charge blown metal to furnace |
| 7 | 4-7 | TU, start blow (center 2500 $O_2$ - 500 Ar; annulus 280 NG) Add 9,550 lb charge Cr to furnace during blow |
| 8 | 7-13 | Change gas ratios 3 $O_2$:1 Ar:NG (center 1900 $O_2$ - 625 Ar; annulus 280 NG) |
| 9 | 13-21 | Change gas ratios 1 $O_2$:2 Ar:NG (center 900 $O_2$ - 1700 Ar; annulus 50 Ar - 160 NG) |
| 10 | 21-29 | Change gas ratios 1 $O_2$:3 Ar:NG (center 625 $O_2$ - 1875 Ar; annulus 60 Ar - 110 NG) |
| 11 | 29-30 | Add 4360 lb lime to furnace |
| 12 | 30-35 | Change gas ratios 1 $O_2$:5 Ar:NG (center 400 $O_2$ - 2000 Ar; annulus 95 Ar - 90 NG) |
| 13 | 35-36 | TD, Temp 2870 F |
| 14 | 36-39 | TU, continue blow 1 $O_2$:5 Ar:NG |
| 15 | 39-41 | TD, Temp 2950 |
| 16 | 41-43 | TU, continue blow 1 $O_2$:5 Ar:NG |
| 17 | 43-45 | TD, Temp 2990 F, sample metal and slag, (0.016% C, 7.0% Cr) |
| 18 | 46-49 | TU, blow (center 300 $O_2$ - 2400 Ar; annulus 160 Ar) Add reduction mix (4,450 lb 50% FeSi, 1000 lb lime, 350 lb electrolytic Mn) |
| 19 | 49-64 | TD, Temp 2940 F, sample metal and slag, (0.052% C, 11.2% Cr) |
| 20 | 64 | Tap furnace |

*Gas flows are in SCFM.

Ladle analysis of this heat was as follows:

| %C | %Mn | %P | %S | %Si | %Ni | %Cr |
|---|---|---|---|---|---|---|
| 0.051 | 0.63 | 0.024 | 0.013 | 0.70 | 0.20 | 11.67 |

We claim:

1. A process for producing a chromium-containing steel the steps comprising:
   a. forming a steelmaking heat by charging into a refractory-lined steelmaking vessel a charge comprising molten iron containing at least carbon, silicon and phosphorus as impurities, and solid steel scrap in amounts up to about 30 to 35% by weight of total charged metallics;
   b. adding a first basic slag-forming flux to the heat and subjecting the heat to a first blowing step in which oxygen is blown for a time sufficient to melt said solid steel scrap and to reduce the phosphorus content of the heat to below about 0.03% by oxidation thereof, and to oxidize a substantial portion of the other impurities, and to provide a first basic fluid slag having a fluid V-ratio of from about 1.5 to 8.0;
   c. removing substantially all of said first fluid slag from the heat;
   d. adding sufficient chromium-bearing material selected from the group consisting of ferrochromium, chromium containing scrap and mixtures thereof to the deslagged charge to provide approximately the final desired chromium content;
   e. subjecting the heat to a second blowing step in which oxygen is injected through the vessel and into the heat below the surface thereof and substantially at the surface of the vessel refractory lining while simultaneously injecting a hydrocarbon-containing protective jacket fluid surrounding the injected oxygen, thereby melting the chromium bearing material;
   f. adding a second basic slag-forming flux to the chromium-containing heat to form a second basic fluid slag while continuing the second blowing step until the carbon content of the heat is reduced to the final desired level;
   g. blowing an inert gas through the heat to remove dissolved reaction and process gases from the heat, while adding sufficient ferrosilicon to the heat to reduce oxidized chromium from the slag; and
   h. thereafter tapping the heat.

2. A process according to claim 1 in which said first blowing step comprises injecting oxygen through the vessel and into the heat below the surface thereof and substantially at the surface of the vessel refractory lining while simultaneously injecting a hydrocarbon-containing protective jacket fluid surrounding the injected oxygen.

3. A process according to claim 1 in which said hydrocarbon-containing protective jacket fluid comprises natural gas.

4. A process according to claim 3 in which said natural gas is injected at a rate of from about 8% to about 10% of the oxygen injection rate.

5. A process according to claim 1 in which a small amount of oxygen is blown in admixture with the inert gas in the blowing step (g) while simultaneously injecting a hydrocarbon-containing protective jacket gas surrounding said mixture.

6. A process according to claim 3 in which said oxygen and inert gas are blown at a ratio of about 9:1 respectively while said hydrocarbon-containing gas is blown at a rate of about 50% of the oxygen rate.

7. A process according to claim 1 in which the heat is subjected to subatmospheric pressures during the blowing step (f) to reduce chromium oxidation during said blowing step (f).

8. A process according to claim 1 in which an inert gas is introduced into the heat during the blowing step (f) in admixture with at least one of the other blown constituents, in an amount sufficient to reduce chromium oxidation during said blowing step (f).

9. A process according to claim 8 in which the inert gas is introduced after the carbon content of the bath has been reduced to below about 1.0%.

10. A process according to claim 8 in which said inert gas is introduced at a rate sufficient to provide a ratio of oxygen to inert gas of from about 3:1 to 1:3.

11. A process according to claim 8 in which blowing step (f) is commenced without the introduction of an inert gas, and the heat blown until the carbon content thereof has been reduced to about 1.0%, thereafter blowing with an oxygen to inert gas ratio of about 3:1 until the carbon content of the bath is reduced to about 0.4%, thereafter blowing with an oxygen to inert gas ratio of about 1:2 until the carbon content of the heat is reduced to about 0.04%, thereafter blowing with an oxygen to inert gas ratio of about 1:3 until the carbon content of the bath is reduced to about 0.01%, and thereafter blowing with an oxygen to inert gas ratio of about 1:9 for blowing step (g).

12. A process according to claim 1 in which said chromium-bearing material consists primarily of chromium-bearing scrap steel and ferrochromium.

13. A process according to claim 12 in which said ferrochromium is a low-grade, high carbon ferrochromium.

14. A process according to claim 1 in which said chromium-bearing material consists primarily of chromium-bearing scrap steel, and exothermically oxidizable material is charged therewith in an amount sufficient to provide heat during subsequent blowing step to melt the chromium-bearing scrap steel without excessive chilling of the heat.

15. A process according to claim 14 in which said endothermically oxidizable material comprises ferrosilicon.

16. A process according to claim 1 in which said first basic slag has a fluid V-ratio of 2.5 to 4.5.

17. A process according to claim 1 in which said basic slag-forming flux is in granulated form and is added to the heat by entraining said flux within the oxygen injected into the heat.

* * * * *